United States Patent [19]

Kreider

[11] 3,896,138

[45] July 22, 1975

[54] HIGH OPACITY RESIN COATINGS

[75] Inventor: Robert W. Kreider, St. Charles, Ill.

[73] Assignee: DeSoto, Inc., Des Plaines, Ill.

[22] Filed: Feb. 8, 1973

[21] Appl. No.: 330,672

Related U.S. Application Data

[63] Continuation-in-part of Ser. No. 239,719, March 30, 1972, Pat. No. 3,819,542, and Ser. No. 245,266, April 18, 1972, and Ser. No. 277,918, Aug. 4, 1972, Pat. No. 3,817,880.

[52] U.S. Cl....252/301.2 R; 252/301.2 W; 252/301.3 R; 260/2.5 R; 260/8; 260/17 A; 260/29.6 TA; 260/29.6 R; 260/29.6 RB; 260/29.6 MH; 260/29.6 E; 260/29.6 ME; 260/29.6 WH; 260/29.6 B; 260/41 R; 260/41 B; 264/49

[51] Int. Cl............................................. C09k 1/02

[58] Field of Search...252/301.2 R, 301.3 R, 301.2 W; 260/29.6 B, 29.6 E

[56] References Cited
UNITED STATES PATENTS

| | | | |
|---|---|---|---|
| 3,022,189 | 2/1962 | Malmquist | 252/301.3 |
| 3,355,513 | 11/1967 | Sadron et al. | 252/301.2 R |
| 3,358,054 | 12/1967 | Hardt et al. | 260/17 A |
| 3,489,703 | 1/1970 | Borucki | 252/301.2 R |
| 3,513,102 | 5/1970 | Heidke | 252/301.2 R |
| 3,669,728 | 6/1972 | Seiner | 260/17 R |
| 3,669,729 | 6/1972 | Seiner | 260/29.6 B |

*Primary Examiner*—Arthur P. Demers
*Attorney, Agent, or Firm*—Dressler, Goldsmith, Clement & Gordon, Ltd.

[57] ABSTRACT

An aqueous latex coating composition adapted to deposit films which dry to form a cellular layer of high opacity and brightness is provided by swelling the resin particles of the aqueous latex with a primary organic solvent which is essentially immiscible in the aqueous phase of the latex, such as xylene, and by introducing into the aqueous phase an at least partially water miscible organic solvent, such as propylene glycol, having a lower evaporation rate and a lesser capacity for solvating the resin of the latex than said primary solvent. When the primary solvent evaporates, a cellular film is formed, the secondary solvent serving to increase the opacification which is obtained. An optical brightener or fluorescent agent is incorporated by dissolving it in the primary organic solvent to thereby become incorporated within the polymeric material of the cellular film to create added brightness and bolder color when the films are irradiated with ultraviolet-containing light.

12 Claims, No Drawings

HIGH OPACITY RESIN COATINGS

The present invention is a continuation-in-part of my prior applications Ser. No. 239,719, filed Mar. 30, 1972, now U.S. Pat. No. 3,819,542; Ser. No. 245,266, filed Apr. 18, 1972; and Ser. No. 277,918, filed Aug. 4, 1972, now U.S. Pat. No. 3,817,880 which relate to the provision of aqueous latex coating compositions in which the resin particles of the latex are constituted by polymers of low opacity, the latex including a primary organic solvent which is essentially immiscible in the aqueous phase of the latex to be absorbed into the polymer particles of the latex, and a secondary water-miscible organic solvent which is a poor solvent for the polymer to be retained in the aqueous phase of the latex. With this latex structure, the deposited latex dries to produce a cellular film which is substantially completely opaque in the absence of large amounts of added pigment because the cells of the film function to scatter light.

In this invention, an optical brightener or fluorescent agent is incorporated into the cellular film by dissolving the same into the water immiscible solvent which is absorbed into the polymer particles of the latex so that light including ultraviolet light which is scattered through the dried cellular film is absorbed by the brightener or fluorescent agent which then emits visible light (which may be white light or colored light as desired) and this serves to add brightness and brilliance of coloration, and it also increases the opacity of the film.

It is stressed that very little pigment can be present in the film since, if adequate film opacity requires any significant pigmentation, then the pigment absorbs some of the ultraviolet light which would otherwise reach the brightener or fluorescent agent and it also absorbs some of the visible light emitted by the brightener or fluorescent agent so that the presence of pigment is self-defeating.

It is possible to modify an aqueous latex coating composition to include a proportion of organic solvent which may be a solvent for the polymer particles of the latex or a non-solvent for the polymer particles of the latex. If this is done under circumstances which minimize coalescence of the polymer particles in the film which is deposited, then an intermediate degree of opacity is generated. Contrast ratios (the ratio of light reflected from a white undersurfaced area to the light reflected from a black undersurfaced area) of about 0.4–0.5 can be obtained in this way without added pigmentation. In commercial practice with the application of wet films having a thickness of about 3–6 mils, a contrast ratio of 0.88 or higher is considered to be reasonably good and the use of primary and secondary solvents as noted heretofore consistently provides contrast ratios in excess of 0.7, frequently in excess of 0.8, with no pigmentation.

To contrast the results obtained by the art using single solvents, reference is made to French Pat. No. 70.47365 which uses a non-solvent for the polymer particles to modify the latex. The contrast ratios obtained with and without added pigmentation ($TiO_2$) are set forth in this patent in a Table E. Using 50 parts of non-solvent per 100 parts of polymer solids, the contrast ratio at 0% $TiO_2$ was only 0.438. By adding $TiO_2$ at a pigment to binder ratio of 1:1, the contrast ratio was raised to 0.926 and then to 0.952 at a pigment to binder ratio of 2:1. Even at 100 parts of nonsolvent per 100 parts of polymer solids, the contrast ratio was only 0.533. Addition of $TiO_2$ at a pigment to binder ratio of 0.5:1 raised the contrast ratio to 0.85 and more pigment to a ratio of 1.5:1 raised the contrast ratio to 0.948. These high pigment loadings largely destroy the effectiveness of the optical brightener or fluorescent agent, and pigment to binder ratios herein are essentially lower than 0.2:1, preferably less than 0.1:1, and most desirably pigment is essentially absent.

When the pigment-free film has a contrast ratio above about 0.7, and more preferably above 0.8, then the brightener or fluorescent agent generates intense brightness producing an attention-getting effect which is highly desirable in signs and the like, especially when used outdoors. As the films become more and more transparent, the brightener or fluorescent agent has less and less effectiveness since much of the light passes through the film and back instead of being forced to become scattered within the film and ultimately absorbed by the agents within the film.

Referring more particularly to my prior applications, Ser. No. 239,719, filed Mar. 30, 1972, more fully describes the at least partially water miscible secondary organic solvents which enable the achievement in the combination of high opacity in the absence of pigmentation. It will be understood that the high contrast ratio desired develops slowly, and it is the equilibrium value normally substantially reached in about 1 day which is identified, as opposed to the changing ratios which exist before an equilibrium condition is attained.

In my prior application Ser. No. 245,266, filed Apr. 18, 1972, an aliphatic organic solvent which is immiscible in the aqueous phase of the latex and which causes the polymer to fracture when it is absorbed into the polymer particles of the latex is selected as the primary organic solvent. This reduces the amount of solvent needed for the development of good opacity and enables the use of solvents which create less difficulty. Nonetheless, excellent contrast ratios are obtained in the absence of pigment.

Lastly, my prior application Ser. No. 277,918, filed Aug. 4, 1972, adds small amounts of pigment or other particles to enhance opacity and the speed of obtaining it. Pigmentation is preferably avoided herein, and large amounts of pigment are greatly detrimental to the effect desired in this invention as has been explained.

The disclosures of my said prior applications are incorporated herein by reference.

Referring first to the polymer particles which are dispersed in the aqueous continuum of the latex, the chemical nature of these polymer particles is of secondary importance. In preferred practice, and for the purpose of forming a film which will air dry, it is preferred to employ a polymer particle having a low glass transition temperature below 25°C., preferably below 0°C. However, polymer particles possessing higher glass transition temperatures may be used, especially when a moderate bake is used to enhance the coalescence of the polymer particles.

There is also normally employed a dispersing agent in order that the polymer particles will be stably dispersed in the aqueous continuum of the latex. The dispersing agent is normally constituted by a surface active agent which preferably includes a proportion of nonionic surface active agent. These surface active agents are normally present as the result of copolymerization in aqueous emulsion. The nonionic surfactants are not essential and, particularly when the primary organic solvent is aromatic, such as xylene or toluene, it has been found that anionic surface active agents, such as the sodium salt of dodecylbenzene sulfonic acid or sodium lauryl sulfate, are particularly beneficial. Excessive proportions of surfactant, especially nonionic surfactant, can plasticize the polymer particles and undesirably soften them, and should be avoided.

As will later be more fully discussed, the primary and secondary solvents are selected based on their capacity to solvate the polymer which is employed in the polymer particles and this will vary depending upon which polymer is selected. Thus, and while the chemical constitution of the polymer particle is not of primary significance, the chemical constitution of the polymer must be kept in mind in order to properly determine which organic solvents can be used.

In the preferred practice of this invention, the polymer particles are constituted by a copolymer of 20% by weight of ethylene with 80% by weight of vinyl acetate produced by copolymerization in aqueous emulsion. This provides a latex containing at least 20% by weight of polymer particles with the surfactant used being present in an amount below the critical micelle concentration so that the latex can be used as a base within which an approximately equal proportion of styrene is post polymerized. The production of polymer particles in the manner noted is more fully described in my copending Application Ser. No. 239,303, filed Mar. 29, 1972, though it is now believed that the styrene polymerizes outside of the ethylene-vinyl acetate copolymers to provide a latex containing a mixture of polymer particles. As pointed out in said application, the final aqueous latex has a continuous aqueous phase in which is stably dispersed polymer particles of low glass transition temperature (below 25°C., preferably below 0°C.) and monomer which produces a polymer of high glass transition temperature (above 30°C.) is polymerized within the latex.

On the other hand, the polymer particles need not be prepared as described in my said application, but these may instead be polystyrene or polymethyl methacrylate emulsion polymers or emulsion copolymers containing styrene, methyl methacrylate or the like, together with, for purposes of illustration, from 5–25% of ethyl acrylate or butyl methacrylate or other monovinyl ester. When the noted homopolymers are used, baking is normally employed to help form a continuous film. Mixtures of a separately formed latex of polymer particles of low glass transition temperature with a latex of polymer particles of high glass transition temperature are also useful as, for example, 50 parts of polystyrene latex with 50 parts of a 20/80 ethylene/vinyl acetate copolymer latex. The air dry films made in this manner, when modified with solvents as disclosed herein, exhibit the opacity which is the primary purpose of this invention. It is again stressed that all that is required herein from the standpoint of the polymer particles and the primary solvent is that the polymer particles be stably suspended in the aqueous medium and be capable of absorbing water immiscible organic solvent to cause the polymer particle to swell. When the aqueous latex is stirred to incorporate the organic solvents, a partial agglomeration of the swollen polymer particles apparently takes place so that, when the latex is deposited as a film and dried, a cellular film is formed in which the cells are many times larger than the polymer particles in the latex.

From the standpoint of the swollen polymer particle, a 5% volumetric increase in the polymer size is usually adequate. Indeed, it has been found that as little as 5 parts by weight of the primary solvent, per 100 parts of polymer, is enough to swell the polymer particles adequately to induce a degree of cellular formation on drying. It is preferred, however, to use a larger proportion of primary solvent, e.g., at least about 15 parts by weight of primary solvent per 100 parts by weight of polymer. In preferred practice, it has been found that from about 20 to about 80 parts of primary solvent per 100 parts of polymer are preferred, but it will be kept in mind that from the practical standpoint, it is desired to employ as little of the primary solvent as is consistent with the development of the best opacity.

The primary solvent which is employed should be essentially water immiscible. By this, it is meant that at least half of the primary solvent which is initially placed in the aqueous phase migrates from this phase into the polymer particles in order to swell the same. Conversely, less than 50% of the primary solvent remains in the aqueous phase. The primary solvent on being absorbed into the polymer particle necessarily swells the same, but there is a limit to the extent of solvency which can be tolerated since, when the primary solvent has an excessive capacity to dissolve the polymer particle, there results a degree of emulsion instability causing coagulation of the emulsion. The use of a small amount of divinylbenzene or polyacrylate, such as ethylene glycol dimethacrylate or the like, to cross-link the polymer particle increases the capacity to handle large amounts of primary solvent, but this is not essential. The careful addition of emulsifier and/or latex stabilizer while the solvent is added also helps to prevent undesired coagulation. Aromatic solvents such as benzene, xylene, toluene, ethylbenzene, and the like, will illustrate primary solvent which are applicable to the swelling of all of the polymer particles which are contemplated. Water immiscible aliphatic solvents which are adequately absorbed by the polymer particle are also applicable for use as the primary solvent, butyl Carbitol acetate and ethyl Carbitol acetate (Carbitol identifies diethylene glycol) being illustrative of this class of materials. Aliphatic hydrocarbons such as mineral spirits may also be used, though the mechanism of action may be more complex since crazing or microfracturing of the cell walls may also be induced. The desired swelling of the polymer particles requires absorption of at least about 5% by weight of the primary solvent. Preferred primary solvents are less volatile than water.

The secondary organic solvent is important in the combination under consideration. First, the secondary solvent must be at least partially water miscible so that the major proportion thereof remains in the water phase and does not migrate into the polymer particles until after the latex has been deposited and the water content of the latex largely evaporated. Preferred secondary solvents in accordance with this invention are illustrated by ethylene glycol, diethylene glycol, propylene glycol, butylene glycol, and polyethylene glycol having a molecular weight of about 150, and the like. 2-ethoxy ethanol and 2-ethoxy ethylene glycol will further illustrate the secondary solvents which may be used, but these tend to upset the stability of the emulsion and must be used with care, e.g., the proportion of use should be limited. In some instances where the primary solvent is sufficiently volatile, butyl alcohol may be used as the secondary solvent.

In normal practice, at least 20 parts of secondary solvent are desirably present per 100 parts of polymer particle. As little as about 5 parts of secondary solvent on the same basis provides limited improvement. It is preferred to employ a ratio of primary to secondary solvent such that the primary solvent is present in a weight ratio in the range of 2:1 to 1:3 with respect to the secondary solvent. A ratio of 25–50 parts of primary solvent to 50 parts of secondary solvent per 100 parts of polymer is presently considered to constitute best practice.

It is desired that the secondary solvent have a reduced capacity for solvating the polymer particles. The action of the primary and secondary solvents is complex and it is possible that many cell forming mechanisms occur and cooperate in the production of the desired cellular construction. Accordingly, it is not intended to be limited by any theory of action.

The primary solvent is used to pull the optical brightener or fluorescent agent, either alone or together with solvent-soluble dyes into the polymer particles and this causes all of these agents to become incorporated within the polymeric material of the cellular film to create added brightness and bolder color when the films are irradiated with ultraviolet-containing light.

Very low proportions of dissolved dye yield films possessing deep tones so that this technique provides very attractive colors, and does so with great economy. This is illustrated by dissolving 0.25 parts of a dye such as azo-oil-Blue Black dye (General Aniline) in 24.75 parts of xylene, and this was used in place of xylene itself to produce a film which was not only opaque, but which was colored a medium shade of blue with moderate intensity. This is a considerable depth of color from a very small amount of dye.

Just as small amounts of dye produce a very deep tone, small amounts of optical brightener and/or fluorescent agents are effective to produce a striking increase in brightness and color brilliance. The effect is especially noticeable in daylight, particularly in sunlight, but any source of ultraviolet shows the effect.

Optical brighteners and fluorescent agents are available in water soluble or solvent soluble (but water insoluble) forms. The solvent soluble materials are more effective agents than the water soluble ones. The solvent soluble agents are intrinsically superior and they become incorporated within the polymeric material of the cellular film where they are better protected from the elements, a matter of great significance in outdoor paints which is the primary area of interest herein. Even indoors, the incorporation of the brightener or the fluorescent agent is helpful since the coatings are more durable and less subject to running or streaking if water is encountered. Moreover, the use of water soluble brighteners and fluorescent agents in this invention is largely ineffective for reasons which are not fully understood. To illustrate, some water soluble brighteners which possess reasonable fluorescent capacity are completely ineffective herein in the same concentrations which are highly effective when solvent soluble brighteners are used.

The presence or absence of dyes depends on the color desired. Similarly, the choice of an optical brightener (white) or a fluorescent agent (colored) depends on the optical effect desired. Proportions of 0.1–2% of the weight of the binder are especially contemplated, but proportions are of secondary significance.

The invention is illustrated in the following examples.

EXAMPLE 1

1512 parts of an ethylene-vinyl acetate polymer latex (see note 1) are mixed with 304.0 parts of distilled water in a 3 liter flask. The ethylene-vinyl acetate polymer contains about 20% ethylene, 80% vinyl acetate, with a trace (0.15%) of methacrylic acid. The latex has a solids content of 52.8% and the particles have an average particle size of 0.46 micron (by light scattering).

798 parts of styrene are then added to the latex in the flask with stirring for 15 minutes. Heat is slowly applied (45 minutes) until the flask contents are at 65°C. at which time there is added a solution of 4.0 parts potassium persulfate in 160 parts of distilled water to cause polymerization to take place. The temperature is maintained at 65°C. and a solution of 26.6 parts of the sodium salt of dodecyl benzene sulfonic acid in 488 parts of distilled water is slowly added over a period of 1½ hours. In this way, the latex is maintained close to its point of instability to minimize the proportion of anionic surfactant in the water phase. The 65°C. temperature is then maintained for an additional 3½ hours whereupon the product is cooled to 30°C., removed from the flask, and filtered through a 60 mesh screen.

Note 1 - The ethylene-vinyl acetate polymer latex is made by pre-charging a pressure vessel with 2500 grams of water, 44 grams of hydroxyethyl cellulose, 6.6 grams of sodium bicarbonate, 154 grams of an ethylene oxide condensate with isooctyl phenol (10 mols of oxide per mol of phenol), and 22 grams of potassium persulfate. The feed lines to the vessel are rinsed with 1252 grams of water (degassed). It is estimated that the pressure vessel included 35 grams of residual water from a previous run. The reactor is closed and then heated with agitation and, at 80°C., the vessel is pressurized with ethylene to a pressure of 800 p.s.i.g. Also, at 80°C., vinyl acetate containing a trace of glacial methacrylic acid is added slowly. Over 2½ hours, 3513.4 grams of vinyl acetate and 6.6 grams of methacrylic acid are added while the temperature of 80°C. and the pressure of 800 p.s.i.g. are maintained. Then, 4.5 grams of potassium persulfate in 220 grams of water are added rapidly and the feed lines are rinsed into the vessel with 160 grams of water (it is estimated that 60 grams of water are held up in the feed lines). The temperature is then raised to 85°C. and held for 1 hour before cooling to provide the desired final product.

It is desired to point out that Example 1 provides an aqueous latex containing dispersed polymer particles. On coating and air drying, these polymer particles coalesce to form a hard, tough and adherent continuous film on metal, paper, glass, etc. The deposited film, without pigment, is translucent and has a contrast ratio of 0.15 at about 1.5 mil dry film thickness.

EXAMPLE 2

Dissolve 0.4 grams of Uvitex OB (Ciba-Geigy), an optical brightener, in 35.0 grams of xylene. 5 grams of a 30% sodium lauryl sulfate solution are mixed with 50 grams of propylene glycol and the optical brightener-xylene solution is added thereto. This mixture is then added to 213 grams of the aqueous latex of Example 1 (containing 100 grams of polymer solids) with stirring at 25°–30°C. over a period of 1 hour. The contrast ratio of a 6 mil film (wet) is 0.865 using a standard photovolt instrument which does not include any appreciable ultraviolet component. Under standard fluorescent light or in daylight, the film is white and very bright and lustrous. The film exhibits an internal glow which is easily noted when the film is placed alongside another film of high contrast ratio, but lacking the brightness.

EXAMPLE 3

Example 2 is repeated with the exception that the Uvitex OB optical brightener is replaced with 1.0 gram of Calcofluor White ULA solution (American Cyanamid). The contrast ratio of a 6 mil film (wet) is 0.85. The dried film was bright and lustrous under fluorescent lighting or daylight as in Example 2.

EXAMPLE 4

Dissolve 0.2 gram of Calco Auramine Base (American Cyanamid) in 35 grams xylene. Blend in 90 grams of polystyrene latex (40.0 grams dry polymer) and 92.5 grams of 2-ethylhexyl acrylate/vinyl acetate latex (50.0 grams dry polymer). 5.0 grams of a 30% sodium lauryl sulfate solution are mixed with 50.0 grams of propylene glycol and the Calco Auramine Base-xylene solution is added thereto. This mixture is then added to the blend of polystyrene latex and 2-ethylhexyl acrylate/vinyl acetate latex (50.0 grams dry polymer) with stirring at 25°–30°C. over a period of 1 hour. The film was yellow and, therefore, a contrast ratio could not be obtained accurately. However, the film was highly opaque and very bright and lustrous in fluorescent light and in daylight.

EXAMPLE 5

Example 4 was repeated, with the exception that the Calco Auramine Base was replaced with 0.2 grams of Calcozine Rhodamine BXP. The film was red and very opaque and bright and lustrous in fluorescent light and in daylight.

The invention is defined in the claims which follow.

I claim:

1. An aqueous latex coating composition adapted to deposit a film of low opacity resin which dries to produce a cellular film of high opacity and brightness, consisting essentially of an aqueous continuous phase having stably suspended therein polymer of emulsion polymerized unsaturated monomer in the form of particles of low opacity organic solvent-soluble resin, said polymer particles being swollen by having absorbed therein at least 5 parts by weight per 100 parts of polymer of a primary organic solvent which is essentially immiscible in the aqueous phase of said latex, and at least 5 parts by weight per 100 parts of polymer of a secondary water miscible organic solvent in said aqueous phase, said secondary organic solvent being a glycol having a lower evaporation rate than said primary solvent and a lesser capacity for solvating said polymer, said composition further including an organic solvent soluble optical brightener or fluorescent agent dissolved in said primary organic solvent and absorbed therewith in said polymer particles whereby, when said latex is deposited and dried, said solvents will evaporate to produce a film having a contrast ratio of at least about 0.7 in the absence of pigment and said optical brightener or fluorescent agent will be retained within the body of the film.

2. An aqueous latex as recited in claim 1 in which said latex is substantially devoid of pigment.

3. An aqueous latex as recited in claim 1 in which said primary organic solvent is used in an amount of from about 20 to about 80 parts per 100 parts of polymer.

4. An aqueous latex as recited in claim 3 in which said glycol is propylene glycol.

5. An aqueous latex as recited in claim 3 in which said primary organic solvent is aromatic.

6. An aqueous latex coating as recited in claim 1 in which said polymer particles have a glass transition temperature below 25°C. and said solvent-swollen polymer particles have an average diameter of at least about 0.5 micron.

7. An aqueous latex as recited in claim 1 in which said polymer particles are a mixture of particles of polymer having a glass transition temperature below 25°C. and particles of polymer having a glass transition temperature above 30°C.

8. An aqueous latex as recited in claim 1 in which said water immiscible organic solvent has solvent-soluble dye dissolved therein.

9. An aqueous latex as recited in claim 1 in which said optical brightener or fluorescent agent is present in an amount of from 0.1–2% of the weight of the polymer particles.

10. An aqueous latex as recited in claim 2 in which a film formed from the latex has a contrast ratio of at least 0.8.

11. An aqueous latex coating composition adapted to deposit a water resistant film of low opacity resin which dries to produce a cellular film of high opacity and brightness, consisting essentially of an aqueous continuous phase having stably suspended therein polymer particles of low opacity organic solvent-soluble resin, said polymer particles being swollen by having absorbed therein at least 5 parts by weight, per 100 parts of polymer of a primary organic solvent which is essentially immiscible in the aqueous phase of said latex, said polymer particles being a mixture of particles of polymer having a glass transition temperature below 25°C. and particles of polymer having a glass transition temperature above 30°C., said polymer particles being aqueous emulsion polymers of monoethylenic monomers, and at least 5 parts by weight, per 100 parts of polymer, of a secondary water miscible organic solvent in said aqueous phase, said secondary organic solvent being a glycol having a lower evaporation rate than said primary solvent and a lesser capacity for solvating said polymer, said composition being substantially devoid of pigment and further including from 0.1–2% of the weight of the polymer of an organic solvent soluble optical brightener or fluorescent agent dissolved in said primary organic solvent and absorbed therewith in said polymer particles whereby, when said latex is deposited and dried, said solvents will evaporate to produce a water resistant film having a contrast ratio of at least about 0.8 in the absence of pigment and said optical brightener or fluorescent agent will be retained within the body of the film.

12. An aqueous latex as recited in claim 11 in which said primary organic solvent is aromatic, and said glycol is propylene glycol.

* * * * *